US012633640B2

(12) United States Patent
Chang et al.

(10) Patent No.: US 12,633,640 B2
(45) Date of Patent: May 19, 2026

(54) HIGH-DIRECTIVITY DIRECTIONAL COUPLER

(71) Applicant: National Tsing Hua University, Hsinchu (TW)

(72) Inventors: Tsun-Hsu Chang, Hsinchu (TW); Tsung-Chi Yu, Hsinchu (TW); Cheng-Hsuan Chan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 95 days.

(21) Appl. No.: 18/614,915

(22) Filed: Mar. 25, 2024

(65) Prior Publication Data

US 2024/0332776 A1 Oct. 3, 2024

(30) Foreign Application Priority Data

Mar. 29, 2023 (TW) ................................ 112112098

(51) Int. Cl.
*H01P 5/18* (2006.01)
*H01P 3/08* (2006.01)

(52) U.S. Cl.
CPC ................ *H01P 5/18* (2013.01); *H01P 3/081* (2013.01)

(58) Field of Classification Search
CPC .... H01P 5/185; H01P 5/18; H01P 5/16; H01P 5/184; H01P 5/187; H01P 5/19; H01P 1/2039; H03F 2200/132; H03F 2200/204
See application file for complete search history.

(56) References Cited

U.S. PATENT DOCUMENTS

| | | | | |
|---|---|---|---|---|
| 4,158,184 | A | 6/1979 | Kenyon | |
| 4,999,593 | A | 3/1991 | Anderson | |
| 7,132,906 | B2 * | 11/2006 | Podell | H01P 5/185 333/112 |
| 2002/0093384 | A1 * | 7/2002 | Woods | H01P 5/185 331/25 |
| 2011/0273242 | A1 * | 11/2011 | Totani | H01P 5/185 333/116 |

* cited by examiner

*Primary Examiner* — Jessica Han
*Assistant Examiner* — Tyler J Pereny

(57) ABSTRACT

A high-directivity directional coupler includes a mainline metal segment and at least one coupling metal segment. The mainline metal segment is an equal-width transmission or delay line with an impedance the same as a system characteristic impedance and the at least one coupling metal segment comprises a continuous coupling line. The coupling line includes two metal segments having a coupling effect with the mainline metal segment, and a metal segment having no coupling effect with the mainline metal segment. The metal segment without coupling effect is equal-width and used for connecting the two metal segments with coupling effect that are metal lines with gradually changing widths, or metal lines comprising a plurality of coupling lines and delay lines alternately arranged.

4 Claims, 8 Drawing Sheets

(a)

(b)

(a)

(b)

HIGH-DIRECTIVITY DIRECTIONAL COUPLER

CROSS-REFERENCE TO RELATED APPLICATION

This application claims the priority of Taiwanese patent application No. 112112098, filed on Mar. 29, 2023, which is incorporated herewith by reference.

BACKGROUND OF THE INVENTION

1. Field of the Invention

The present invention relates generally to a coupler, and more particularly, to a high-directivity directional coupler applicable to a radio frequency high-power environment, and the high-directivity directional coupler can be used as a radio frequency amplifier for microstrip couplers for power measurement, and/or, waveguide couplers for power measurement in microwave systems.

2. The Prior Arts

In order to measure the power of the microwave in a high-power system, an indirect measurement method must be used, that is, a small portion of power is drawn by electromagnetic coupling from the mainline to the coupling line for power measurement. Then, according to the coupling strength, the power on the mainline is reversely inferred. There may be forward waves and reflected waves in the line at the same time, and both may be coupled to a certain measurement port at the same time, which will cause errors when the power is reversely inferred as it is impossible to know how much of the reversely inferred power is forward and how much is reflective. In order to accurately measure the microwaves in the two traveling directions, the design must ensure that the waves in two directions are separated enough at the coupling end, and the degree of separation is represented by directivity. The higher the directivity, the better the degree of separation, and the more accurate the power measurement of forward wave and reflected wave, respectively.

There are two types of commercially available couplers: waveguide type and microstrip type. The waveguide type is generally used in microwave systems from kilowatts to megawatts because of low loss and good temperature resistance. Microstrip type is generally common in PCB lines, and is easy to integrate with system lines. In some commercial coaxial broadband couplers, the interior is also composed of microstrip type couplers. However, the substrate loss is relatively higher compared to air, and the coupling lines are usually placed very close together for directivity; therefore, microstrip type is generally used for power measurement <100 W, otherwise PCB arcing may occur.

Directional couplers have been widely used in microwave systems. Because the phase speeds of the odd and even modes of general microstrip couplers are different, the directivity of microstrip couplers is not high (<20 dB). When there are both forward and reflected waves in the mainline, if the directivity is insufficient, a very large power measurement error may occur. In order to improve the problem of low directivity of the microstrip coupler, the prior arts have used the alternating arrangement of multiple coupling segments and delay segments to improve the directivity. The principle is to use the phase delay provided by the delay line for voltage cancellation. In the case of using the principle of phase cancellation, the directional bandwidth of the microstrip coupler will be relatively narrow. Under the above circumstances, the directional bandwidth can only be increased through multi-stage cascading. As a result, the size of the coupler will be too long, which will increase the insertion loss and waste microwave energy. In addition, if the distance between the striplines of the coupler is too far, the odd and even mode phase speeds will be very different. Although this type of coupler claims to greatly improve the directivity, the above effects can only be achieved under the premise that the striplines are not far apart.

In order to improve the inherently problem of low microstrip coupler directivity, the U.S. Pat. Nos. 4,999,593 and 7,132,906 use the mode of alternating arrangement of multi-coupling segments and delay segments to improve directivity, and the principle system utilizes phase delay provided by the delay lines for voltage cancellation. Because the coupler uses the principle of phase cancellation, the directional bandwidth will be relatively narrow, which is because the length of the striplines is the same, when the frequency deviates from the center frequency, the delay phase will change, so that the voltage cannot be completely eliminated at the isolated port.

Therefore, the directional bandwidth can only be increased through multi-stage series connection. However, not only the size of the coupler will be too long in this method, the insertion loss increases and the microwave energy is wasted. In addition, since the odd and even mode phase speeds will be very different when the distance between the striplines is too big. Although this type of coupler claims to greatly improve the directivity, the above effects can only be achieved under the premise that the striplines are not far apart. In this case, in order to prevent the strong electric field from breaking through the substrate or the air between the coupling segments, the coupler generally cannot be used in high-power microwave systems of hundreds of watts to kilowatts. Therefore, it is impossible to integrate directional couplers for high-power measurements into RF amplifiers.

U.S. Pat. No. 4,158,184 discloses a coupler structure, and then this similar structure is applied in U.S. Pat. No. 4,999,593 by Motorola Corporation, and is applied in U.S. Pat. No. 7,132,906 by Werlatone Corporation.

In the U.S. Pat. Nos. 4,158,184, 4,999,593, and 7,132,906, all of the patents are applied to a coupled-line coupler and interspersed with a delay line, i.e., using the phase difference to improve directivity. However, in these related documents, the coupling metal segments on the coupling side are all of equal width. Although the traditional equal-width metal lines will not have reflection problems, the distance between the coupling lines should not be too far. Otherwise, as aforementioned, the odd and even mode phase speeds will be too different, which makes it difficult to increase the directivity. Also, the close spacing means that the electric field between the coupling lines is easy too big and therefore not suitable for high-power use.

Therefore, as far as the current coupler is concerned, the way of using multi-coupling segments and delay segments in alternating arrangement to improve directivity, using the phase delay provided by the delay line to achieve voltage cancellation, the directional bandwidth will be relatively narrow because the coupler uses phase cancellation principle (i.e., because the length of the strip line is the same, when the frequency deviates from the center frequency, the delayed phase will change, so that the voltage cannot be completely eliminated at the isolated port), and the aforementioned problems must be addressed. However, the directional bandwidth can only be increased through multi-stage series connection, which will cause the coupler to become too long, which increases the insertion loss and wastes microwave energy. Moreover, in order to accurately measure microwaves in two traveling directions, the waves must be separated enough at the coupling end, and the degree of separation is represented by directivity. In other words, to make the power measurement of the forward wave and reflected wave more accurate, the degree of directivity separation must be higher. However, because the odd and even mode phase speeds will be very different when the distance between striplines is too far apart, even when the coupler claims to greatly improve the directivity, the premise is that the striplines are not far apart. Moreover, in order to prevent the strong electric field from breaking through the substrate and air between the coupling segments, the coupler cannot be used in a hundred-watt to kilowatt-level high-power microwave system. Therefore, the problems remain to be solved.

SUMMARY OF THE INVENTION

A primary objective of the present invention is to provide a high-directivity directional coupler, which is applied in a high-power radio frequency environment. The high-directivity directional coupler of the present invention includes a mainline metal segment and at least one coupling metal segment. The mainline metal segment is an equal-width transmission/delay line whose impedance is the characteristic impedance of the system, the at least one coupling metal segment includes a continuous coupling line, and the coupling line comprises mainly two metal segments having a coupling effect with the mainline metal segment, and a metal segment having no coupling effect with the mainline metal segment. The metal segment without coupling effect is equal-width and is used to connect the two metal segments with coupling effect, and the two metal segments with coupling effect are metal segments with gradually changing width, or are metal segments comprising a plurality of alternatingly arranged coupling and delay lines, wherein the width of the metal lines with coupling effect are gradually changing.

Another objective of the present invention is to provide a high-directivity directional coupler, which is applied in a high-power radio frequency environment and uses phase difference to achieve voltage cancellation to improve directivity. In a preferred embodiment, the coupling side, i.e., the other side of the mainline, comprises two coupling segments and a delay segment, and the two coupling segments are transmission/delay lines with gradually changing impedance, or a plurality of coupling lines and delay lines in alternating arrangement with gradually changing impedance in each coupling line. Because the conventional technology considers better not to have reflection in microwave transmission, the majority uses equal-width coupling lines. However, the design of the high-directivity directional coupler disclosed in the present invention makes the wave reflect at the interface when encountering discontinuous impedance as the wave enters the coupling side for transmission. Through proper calculation and design, the same or higher directivity can be achieved at a shorter distance than the original one, or under the condition that the distance between the coupling lines is farther. The high-directivity directional coupler of the present invention can be used in high-power systems, for example, at microwave power 5000 W.

Another objective of the present invention is to provide a high-directivity directional coupler, which is applied in a high-power radio frequency environment. The high-directivity coupler of the present invention can be used in various high-power applications of microwave amplifiers or microwave systems of hundreds of watts and kilowatts for accurate power measurements. Using the high-directivity directional coupler of the present invention can greatly reduce the volume of the high-power high-directivity coupler, facilitate the module integration of radio frequency power amplifiers and improve the measurement accuracy of forward power, reflected power and standing wave ratio of the system.

Another objective of the present invention is to provide a high-directivity directional coupler, which is applied in a high-power radio frequency environment. In order to improve directivity while improving directivity bandwidth and withstand power, the reflection caused by the progressive impedance change is use to cancel the voltage, which can achieve high directionality even when the distance between the striplines is large; thus, the present invention can be used in high-power situations. Moreover, based on phase cancellation, a metal line whose width envelope gradually changes is used in the coupling metal segment on the coupling side, and the gradual change in width means that the impedance also gradually changes. Although the impedance change may cause reflection, the impedance changing metal segment can greatly increase the directional bandwidth of the coupler with proper design, and can still achieve high-directivity even when the coupling lines are far apart; thus, the present invention can avoid material collapse caused by strong field break through, making the present invention applicable to <5000 W in the microwave system.

To achieve the aforementioned objectives, the present invention provides a high-directivity directional coupler, which is applied in a high-power radio frequency environment. The high-directivity directional coupler of the present invention comprises a mainline metal segment and at least one coupling metal segment; the mainline metal segment being an equal-width transmission/delay line with an impedance the same as a system characteristic impedance; the at least one coupling metal segment comprising a continuous coupling line, the coupling line mainly comprising two metal segments having a coupling effect with the mainline metal segment, and a metal segment having no coupling effect with the mainline metal segment; the metal segment without coupling effect being equal-width and used for connecting the two metal segments with coupling effect; the two metal segments with coupling effect being metal lines with gradually changing widths, or metal lines comprising a plurality of coupling lines and delay lines alternately arranged, wherein the width of the metal lines with coupling function being gradually changed.

The high-directivity directional coupler of the present invention allows the coupler directivity to be relatively large in the stripline distance between the mainline metal segment and at least one coupling metal segment, and can be used for accurate power measurement in a radio frequency high-power system.

The present invention will be apparent to those skilled in the art by reading the following detailed description of a preferred embodiment thereof, with reference to the attached drawings, in which:

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
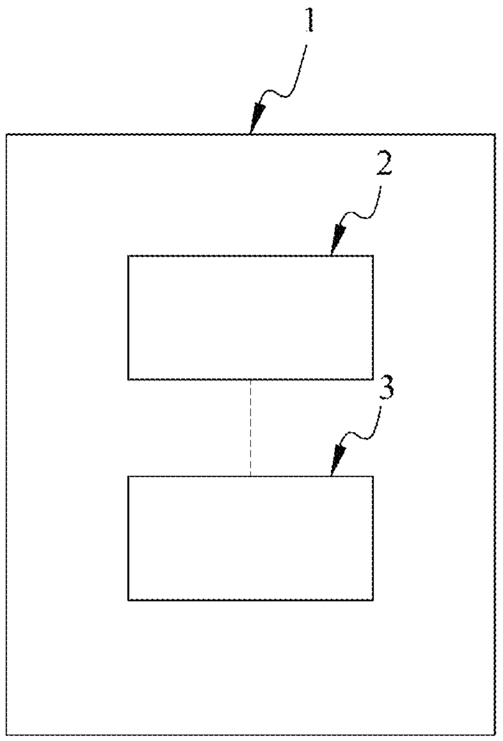
FIG. 1 is a schematic view illustrating the structure and operation of the high-directivity directional coupler of the present invention.

FIG. 1 is a schematic view illustrating the structure and operation of the high-directivity directional coupler of the present invention.

As shown in FIG. 1, the high-directivity directional coupler 1 comprises a mainline metal segment 2 and at least one coupling metal segment 3, the mainline metal segment 2 is an equal-width transmission/delay line whose impedance is the system characteristic impedance, the at least one coupling metal segment 3 includes a continuous coupling line, and the coupling line mainly comprises two metal segments that have a coupling effect with the mainline metal segment, and a metal segment that has no coupling effect with the mainline metal segment. The metal segment without the coupling effect is equal-width and is used to connect the two metal segments with the coupling effect, while the two metal segments with the coupling effect are metal lines with gradually changing widths, or are metal lines with a plurality of coupling lines and delay lines alternatingly arranged, wherein the widths of the metal lines with the coupling function are also gradually changing.

The high-directivity directional coupler 1 of the present invention can be applied to high-power microwave systems. The high-directivity directional coupler 1 utilizes the phase difference caused by transmission line to eliminate the voltage at the coupler isolation end to improve directivity.

For example, the mainline metal segment 2 is the mainline of the high-directivity directional coupler 1, and the coupling metal segment 3 is formed by two coupling metal segments and one delay metal segment on the coupling side, wherein the metal envelope width of the two coupling metal segments generally shows an asymptotic change trend, and is made of a transmission line with a gradual change in impedance, and/or comprises a plurality of metal lines with coupling effect, wherein the plurality of metal lines with coupling effect have different widths and lengths, and the plurality of metal lines with coupling effect are staggered in an uneven pattern.

In addition to placing the coupling metal segment 3 of the coupling side and the mainline metal segment 2 on the same horizontal plane, the high-directivity directional coupler 1 can also vertically arrange the coupling metal segment 3 of the coupling side and the mainline metal segment 2 in different vertical planes.

If a side coupler is changed to a vertical coupler, the basic circuit schematic diagram can still be applied. At this time, the spacing between the coupling lines may not be the same as that of the side coupling. The specific distance depends on the coupling numerical calculation under the vertical arrangement. But, the variation trend of the spacing is still close to each other; while the width part does not change much. This vertical arrangement can be applied not only to microstrip coupling lines, but also to coaxial couplers or waveguide couplers.

The high-directivity directional coupler 1 of the present invention is applied in a high-power radio frequency environment, and uses phase difference to cancel voltage to improve directivity. In one embodiment, the coupling side (the other side of the mainline) comprises two coupling segments and one delay segment, and the two coupling segments are transmission/delay lines whose impedance changes gradually, or comprise a plurality of coupling lines and delay lines arranged alternately and the impedance of each coupling line also changes gradually. Although the conventional technology considers better not to have reflection in microwave transmission, hence the majority uses equal-width coupling lines, the design of the high-directivity directional coupler 1 disclosed in the present invention makes the wave reflect at the interface when encountering the discontinuous impedance of the coupling segment after entering the coupling side for transmission. Through proper calculation and design, the same or higher directivity can be achieved at a shorter distance than the original one, or under the condition that the distance between the coupling lines is farther. The high-directivity directional coupler 1 of the present invention can be used in high-power systems, for example, a system with 5000 W microwave power.

The high-directivity coupler 1 of the present invention can be used for accurate power measurement in various microwave amplifiers or microwave systems of hundred-watt and kilowatt-level high-power, and can greatly reduce the volume of the high-power high-directivity coupler so as to facilitate the module integration of the RF power amplifier and improves the measurement accuracy of forward power, reflected power, and standing wave ratio of the system.

In the high-directivity directional coupler 1 of the present invention, in order to improve directivity while improving directivity bandwidth and withstand power, the reflection caused by the progressive impedance change is use to cancel the voltage, which can achieve high directionality even when the distance between the striplines is large; thus, the present invention can be used in high-power situations. Moreover, based on phase cancellation, a metal line whose width envelope gradually changes is used in the coupling metal segment on the coupling side, and the gradual change in width means that the impedance also gradually changes. Although the impedance change may cause reflection, the impedance changing metal segment can greatly increase the directional bandwidth of the coupler with proper design, and can still achieve high-directivity even when the coupling lines are far apart; thus, the present invention can avoid material collapse caused by strong field break through, making the present invention applicable to <5000 W in the microwave system.

Figure 2:
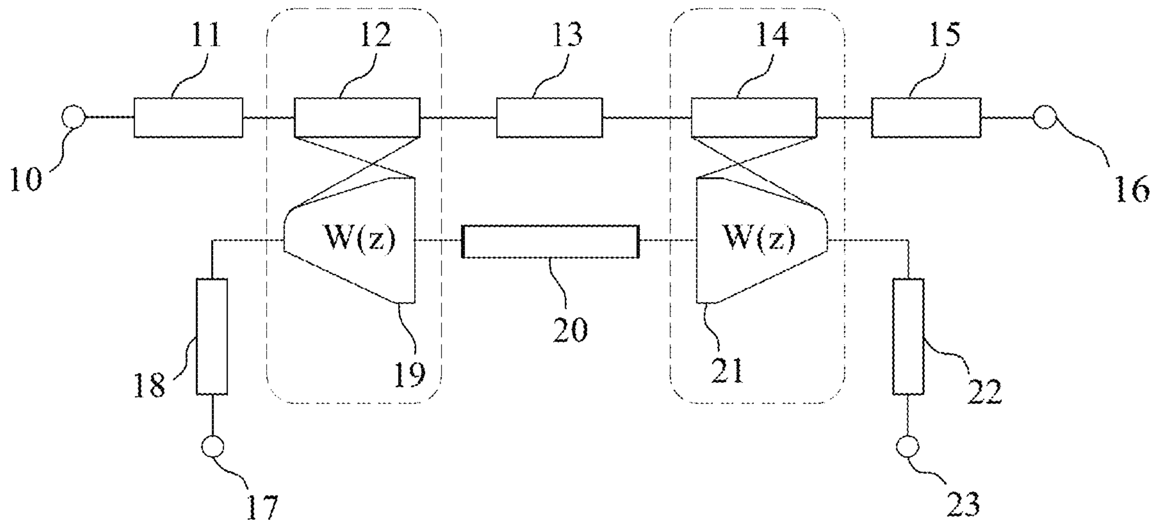
FIG. 2 is a schematic view illustrating the structure and operation of an embodiment of the high-directivity directional coupler of the present invention shown in FIG. 1.

FIG. 2 is a schematic view illustrating the structure and operation of an embodiment of the high-directivity directional coupler of the present invention shown in FIG. 1.

As shown in FIG. 2, the high-directivity directional coupler 1 comprises a mainline metal segment 2 and a coupling metal segment 3, and the mainline metal segment 2 couples a part of energy to the two coupled metal line segments 19, 21 of the coupling metal segment 3 through electromagnetic coupling.

The mainline metal segment 2 includes equal-width metal segments 11, 12, 13, 14, 15. The mainline metal segment 2 is an equal-width transmission/delay line whose impedance is the characteristic impedance of the system. The coupling metal segment 3 of the power coupling segment (side) comprises three transmission (or delay) lines 18, 20, 22 and two metal lines with coupling effect 19, 21, wherein the width envelopes of the two metal lines with coupling effect 19, 21 are gradually changing, that is, the impedance of the metal lines with coupling effect 19 and 21 gradually changes.

Ports 10 and 16 are respectively the input (port 1) and output (port 2) of the high-directivity directional coupler 1. Ports 17 and 23 are the coupling end (port 3) and isolation end (port 4) of the high-directivity directional coupler 1.

Metal segments 12, 14 have power coupling effects with metal line with coupling effect 19,21 respectively, while metal segments 11,13,15 are transmission (delay) lines without coupling effects with coupling metal segments 19,21. Moreover, the transmission (delay) lines 18, 20, 22 are transmission (delay) lines without coupling effect with mainline metal segment 2, wherein transmission (delay) lines 18, 22 are equal-width, and transmission (delay) lines 20 can have equal or non-equal width with the transmission (delay) lines 18, 22.

The metal lines with coupling effect 19, 21 are mirrored with the transmission (delay) line 20 as the center, and are metal segments having a coupling effect with the mainline metal segment 2, and the width envelopes change gradually.

The most direct implementation of the metal lines with coupling effect 19, 21 is to use a metal stripline with a continuous and gradually changing width, or to form a plurality of coupling lines and delay lines with different widths and lengths that are staggered in arrangement, and the overall width envelope shows a gradual change trend.

The transmission (delay) line 20 in the center of the coupling metal segment 3 can be placed in a straight line at different positions, and can also be bent while maintaining the same electrical length to reduce the length of the coupler.

In the present embodiment, although the high-directivity directional coupler 1 comprises a mainline metal segment 2 and a coupling metal segment 3, and the coupling metal segment 3 comprises three transmission (or delay) lines 18, 20, 22 and two metal lines with coupling effect 19, 21, for high-directivity directional couplers with other numbers of coupling metal segments (for example, 4 or more), the principle is the same as the present embodiment; therefore, the details will not be repeated here.

In addition to placing the coupling metal segment 3 of the coupling side and the mainline metal segment 2 on the same horizontal plane, the high-directivity directional coupler 1 can also vertically arrange the coupling metal segment 3 of the coupling side and the mainline metal segment 2 in different vertical planes.

If a side coupler is changed to a vertical coupler, the basic circuit schematic diagram can still be applied. At this time, the spacing between the coupling lines may not be the same as that of the side coupling. The specific distance depends on the coupling numerical calculation under the vertical arrangement. But, the variation trend of the spacing is still close to each other; while the width part does not change much. This vertical arrangement can be applied not only to microstrip coupling lines, but also to coaxial couplers or waveguide couplers.

Figure 3:
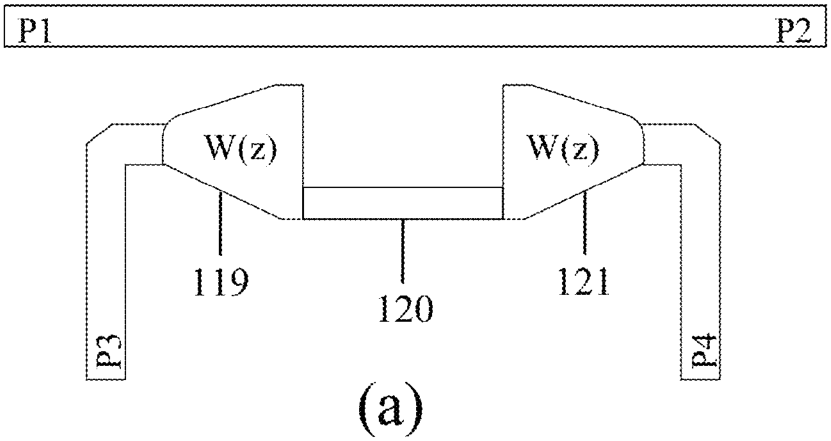
FIGS. 3(*a*) and 3(*b*) are schematic views illustrating the structure and operation of another embodiment of the high-directivity directional coupler of the present invention shown in FIG. 1.
Figure 3:
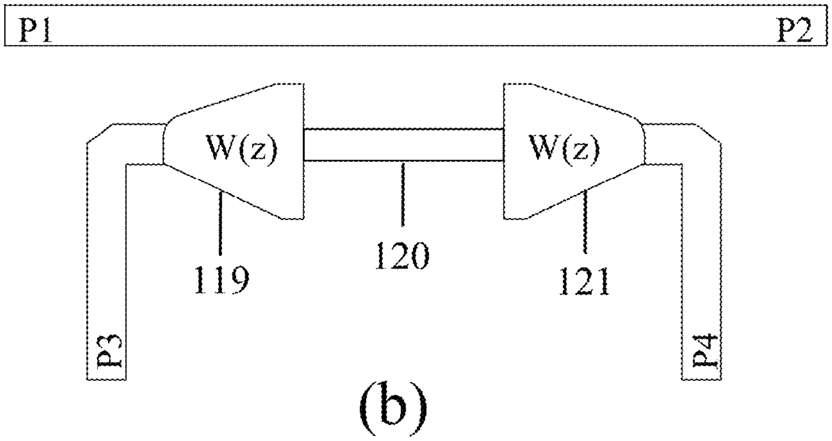

FIGS. 3(*a*), 3(*b*) are schematic views illustrating the structure and operation of another embodiment of the high-directivity directional coupler of the present invention in FIG. 1.

As shown in FIGS. 3(*a*), 3(*b*), the metal lines with coupling effect 119, 121 are mirrored with the transmission (delay) line 120 as the center, and are coupling metal segments having a coupling effect with the mainline metal segment 2, whose width envelope changes gradually.

The most direct implementation of the metal lines with coupling effect 119, 121 is to use a metal stripline with a continuous and gradually changing width, or to form a plurality of coupling lines and delay lines with different widths and lengths that are staggered in arrangement, and the overall width envelope shows a gradual change trend.

In FIG. 3(*a*), the transmission (delay) line 120 in the center of the coupling metal segment 3 can be a straight line that is respectively connected to the lowest positions of the metal lines with coupling effect 119, 121.

In FIG. 3(*b*), the transmission (delay) line 120 in the center of the coupling metal segment 3 can be a straight line that is connected to the central positions of the metal lines with coupling effect 119, 121.

Figure 4:
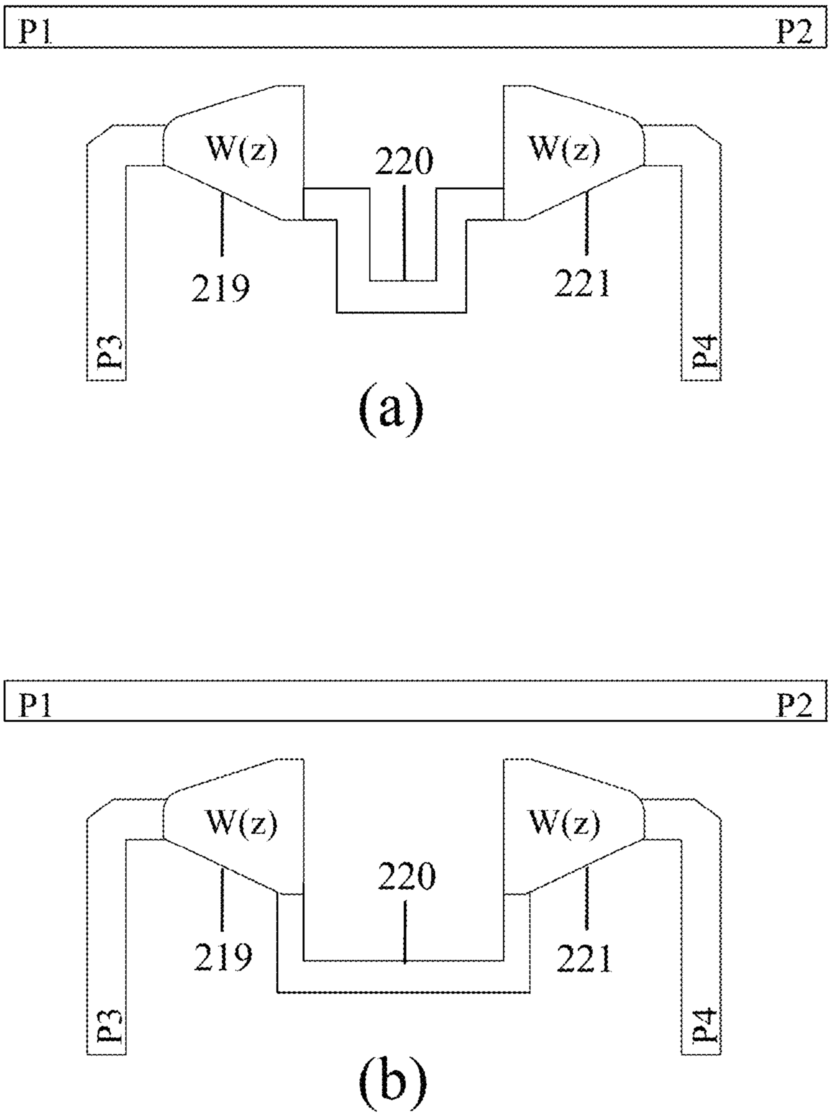
FIGS. 4(*a*) and 4(*b*) are schematic views illustrating the structure and operation of another embodiment of the high-directivity directional coupler of the present invention shown in FIG. 1.

FIGS. 4(*a*), 4(*b*) are schematic views illustrating the structure and operation of another embodiment of the high-directivity directional coupler of the present invention in FIG. 1.

As shown in FIGS. 4(*a*), 4(*b*), the metal lines with coupling effect 219, 221 are mirrored with the transmission (delay) line 220 as the center, and are metal lines having a coupling effect with the mainline metal segment 2, whose width envelope changes gradually.

The most direct way to implement the metal lines with coupling effect 219 and 221 is to use a metal stripline with continuous and gradually changing width, and the overall width envelope shows a gradual change trend.

In FIG. 4(*a*), the transmission (delay) line 220 at the center of the coupling metal segment 3 is not a straight line, but is bent while maintaining the same electrical length to reduce the length of the coupler, and is respectively connected to the lowest position of the metal lines with coupling effect 219, 221.

In FIG. 4(*b*), the transmission (delay) line 220 at the center of the coupling metal segment 3 is not a straight line, but is bent while maintaining the same electrical length to reduce the length of the coupler, and is respectively connected to the bottom of the metal lines with coupling effect 219, 221.

Figure 5:
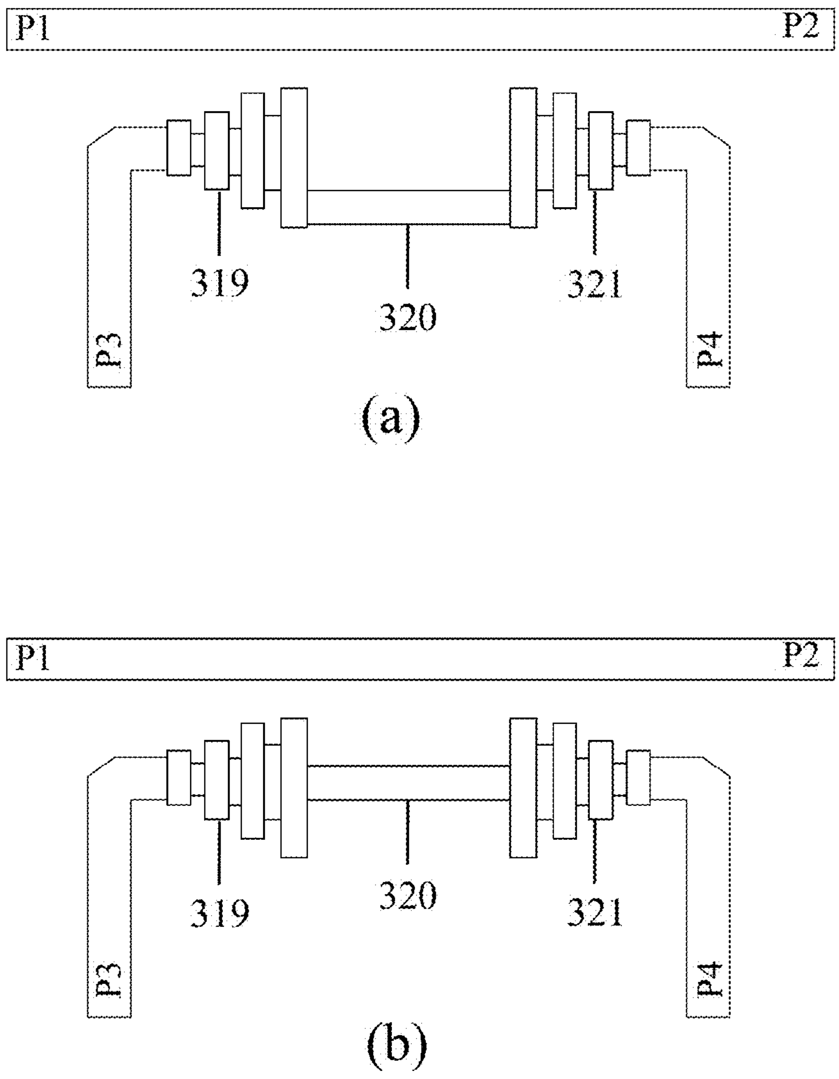
FIGS. 5(*a*) and 5(*b*) are schematic views illustrating the structure and operation of another embodiment of the high-directivity directional coupler of the present invention shown in FIG. 1.

FIGS. 5(*a*), 5(*b*) are schematic views illustrating the structure and operation of another embodiment of the high-directivity directional coupler of the present invention in FIG. 1.

As shown in FIGS. 5(*a*), 5(*b*), the metal lines with coupling effect 319, 321 are mirrored with the transmission (delay) line 320 as the center, and are metal lines having a coupling effect with the mainline metal segment 2, whose width envelope changes gradually.

The metal lines with coupling effect 319, 321 are formed by interleaving a plurality of coupling lines and delay lines with different widths and lengths, and the overall width envelope shows a gradual change trend.

In FIG. 5(*a*), the transmission (delay) line 320 at the center of the coupling metal segment 3 is a straight line, and is respectively connected to the lowest position of the metal lines with coupling effect 319, 321.

In FIG. 5(*b*), the transmission (delay) line 320 at the center of the coupling metal segment 3 is a straight line, and is respectively connected to the central position of the metal lines with coupling effect 319, 321.

Figure 6:
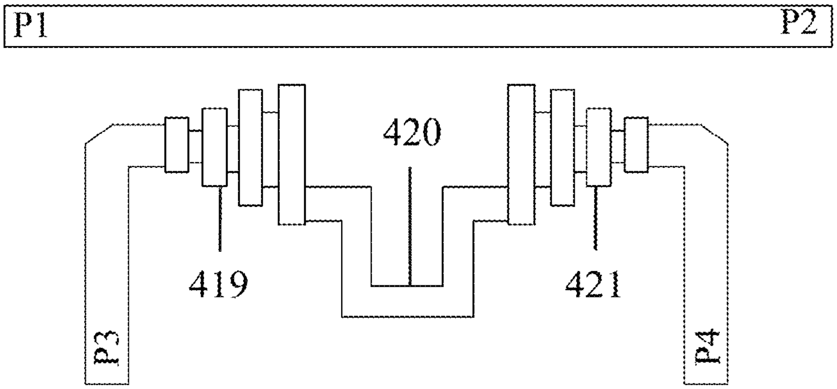
FIGS. 6(*a*) and 6(*b*) are schematic views illustrating the structure and operation of another embodiment of the high-directivity directional coupler of the present invention shown in FIG. 1.
Figure 6:
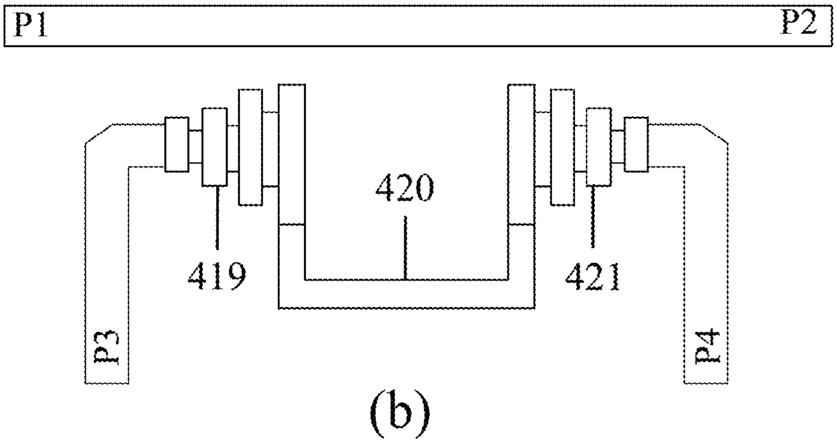

FIGS. 6(*a*), 6(*b*) are schematic views illustrating the structure and operation of another embodiment of the high-directivity directional coupler of the present invention in FIG. 1.

As shown in FIGS. 6(*a*), 6(*b*), the metal lines with coupling effect 419, 421 are mirrored with the transmission (delay) line 420 as the center, and are metal lines having a coupling effect with the mainline metal segment 2.

The metal lines with coupling effect 419, 421 are formed by interleaving a plurality of coupling lines and delay lines with different widths and lengths, and the overall width envelope shows a gradual change trend.

In FIG. 6(*a*), the transmission (delay) line 420 at the center of the coupling metal segment 3 is not a straight line, but is bent while maintaining the same electrical length to reduce the length of the coupler, and is respectively connected to the lowest position of the metal lines with coupling effect 419, 421.

In FIG. 6(*b*), the transmission (delay) line 420 at the center of the coupling metal segment 3 is not a straight line, but is bent while maintaining the same electrical length to reduce the length of the coupler, and is respectively connected to the bottom of the metal lines with coupling effect 419, 421, or a straight line connecting to the central position of the metal lines with coupling effect 419, 421.

Figure 7:
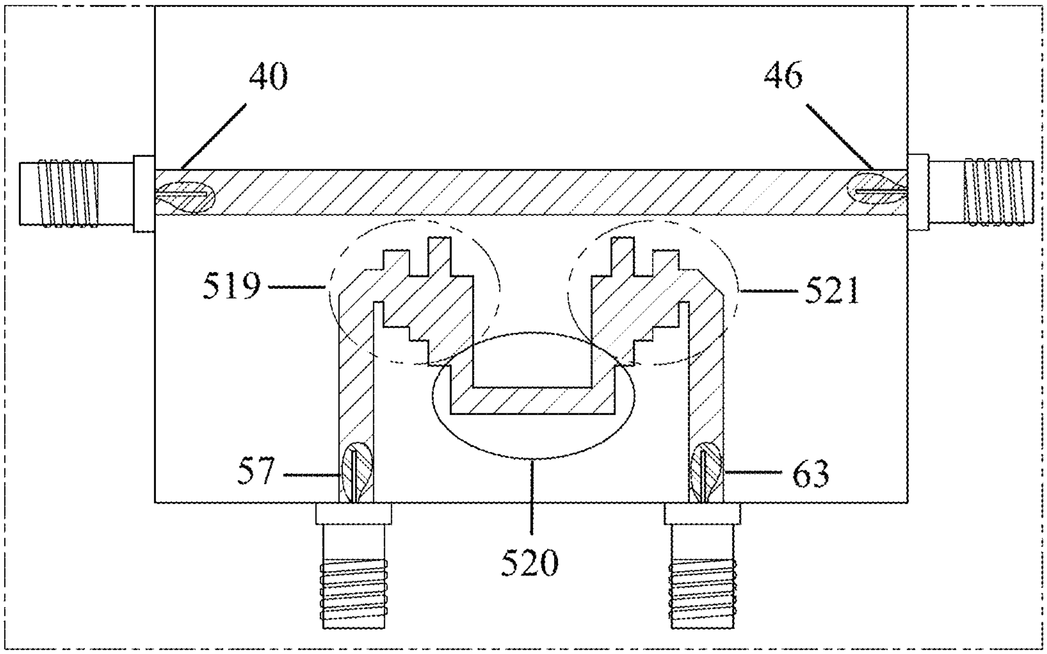
FIG. 7 is a schematic view illustrating the structure and operation of another embodiment of the high-directivity directional coupler of the present invention shown in FIG. 1.

FIG. 7 is a schematic view illustrating the structure and operation of another embodiment of the high-directivity directional coupler of the present invention shown in FIG. 1.

As shown in FIG. 7, the high-directivity directional coupler 1 can be applied to a frequency of 0-700 MHZ, the full frequency band of the coupler directivity can reach 30 dB up, and applicable to a 1000 W radio frequency power amplifier. The ports 40 and 46 of the high-directivity directional coupler 1 are respectively the input (port 1) and the output (port 2) of the high-directivity directional coupler 1; and the ports 57 and 63 are the coupling end (port 3), isolated end (port 4) of the high-directivity directional coupler 1, respectively.

When distinguishing coupling or non-coupling segments, it must be considered that the closer the two metal lines are, the greater the coupling value from the mainline metal segment 2 to the line on the other side will be. Once the two become far apart, the value will be severely attenuated. Therefore, the delay segment 520 in the solid circle of FIG. 7 is basically a metal segment without coupling effect. The two protrusions of the coupling segments 519 and 521 in the dotted circle have a coupling effect with the mainline metal segment 2. There are some coupling effects for other ones that are farther away, but the coupling effects are weaker and can be regarded as having no coupling effect.

Figure 8:
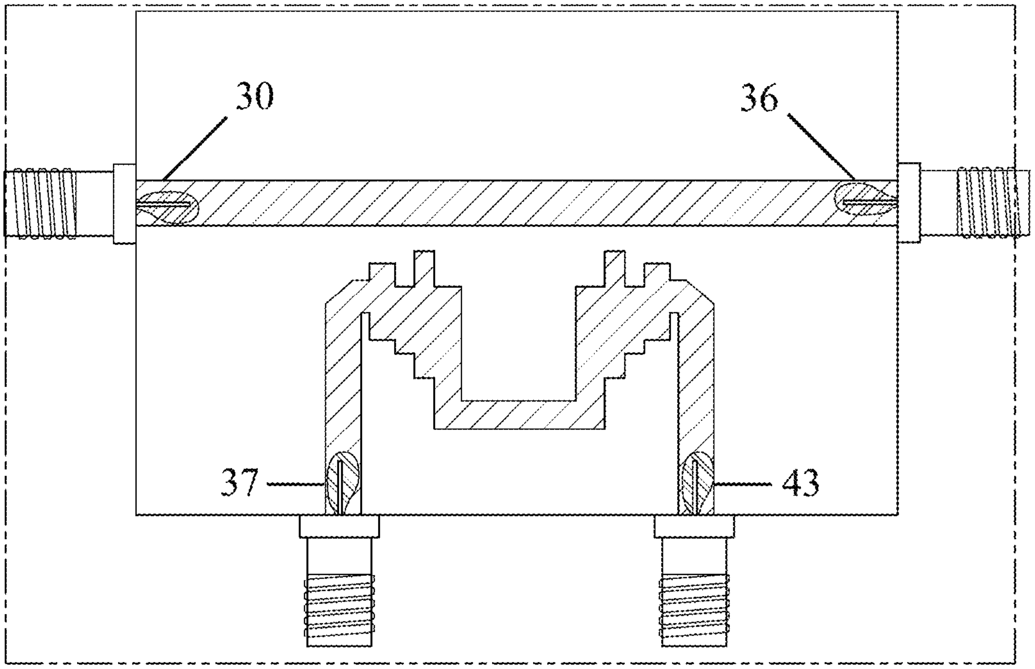
FIG. 8 is a schematic view illustrating the structure and operation of another embodiment of the high-directivity directional coupler of the present invention shown in FIG. 1.

FIG. 8 is a schematic view illustrating the structure and operation of another embodiment of the high-directivity directional coupler of the present invention shown in FIG. 1.

As shown in FIG. 8, the high-directivity directional coupler 1 can be applied to the whole frequency band of 0-700 MHz, can have directivity of at least 30 dB, and has been applied to the radio frequency module of 500 MHz 900 W.

Ports 30 and 36 of the high-directivity directional coupler 1 are respectively the input (port 1) and output (port 2) of the high-directivity directional coupler 1; and ports 37 and 43 are the coupling end (port 3) and isolation end (port 4) of high-directivity directional coupler 1, respectively.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A high-directivity directional coupler, applicable to a high-power radio frequency (RF) environment, comprising:

a mainline metal segment; and at least one coupling metal segment including a continuous coupling line, the continuous coupling line comprising two first metal segments having a coupling effect with the mainline metal segment, and a second metal segment having no coupling effect with the mainline metal segment, each of the two first metal segments having a gradually changing width showing an asymptotic change trend;

wherein the mainline metal segment is a mainline, the at least one coupling metal segment is a power coupling segment/side, the mainline metal segment couples energy to the at least one coupling metal segment through electromagnetic coupling, and each of the two first metal segments comprises a plurality of alternatingly arranged coupling lines and delay lines with an overall gradually changing width.

2. The high-directivity directional coupler according to claim 1, wherein the mainline metal segment is an equal-width transmission/delay line with an impedance the same as a system characteristic impedance.

3. The high-directivity directional coupler according to claim 1, wherein the high directivity directional coupler is used as a microstrip coupler for power measurement in RF amplifiers.

4. The high-directivity directional coupler according to claim 1, wherein the high directivity directional coupler is used as a waveguide coupler for power measurement in a microwave system.

* * * * *